United States Patent Office 3,313,105
Patented Apr. 11, 1967

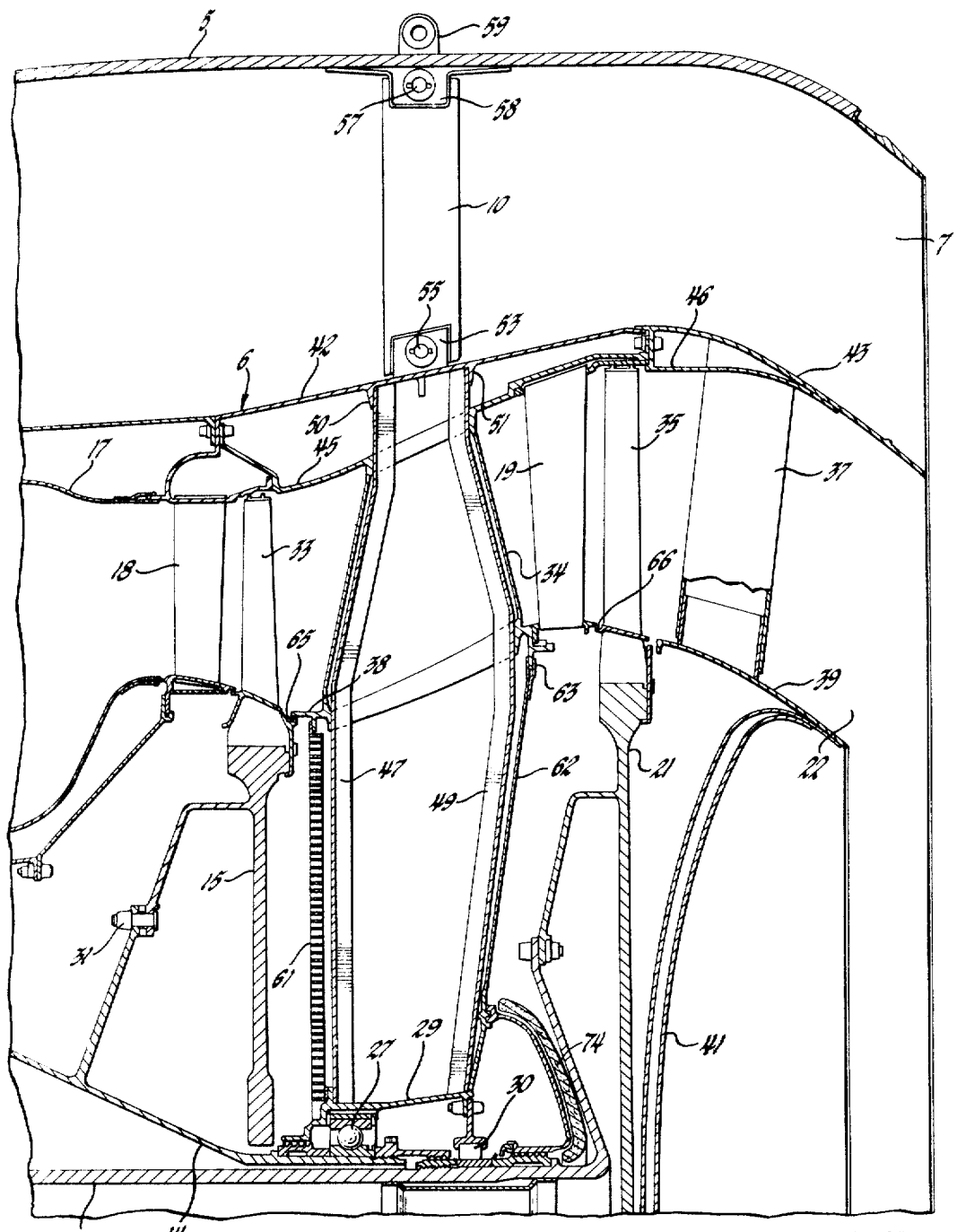

3,313,105
GAS TURBINE ENGINE HAVING TURBO-COMPRESSOR THRUST BEARING MEANS RESPONSIVE TO DIFFERENTIAL PRESSURES
Douglas Johnson, Indianapolis, Ind., assignor to General Motors Corporation, Detroit, Mich., a corporation of Delaware
Filed Aug. 30, 1965, Ser. No. 483,569
4 Claims. (Cl. 60—39.16)

My invention is directed to gas turbine engines, more particularly to means for supporting the rotary parts of such engines, and may include features particularly suited to the requirements of ducted fan propulsion engines. The nature of the invention is such as to provide an exceptionally lightweight structure, which is therefore particularly adapted to lift engines.

In accordance with my invention, the engine includes a rotor assembly comprising a compressor and a turbine, a main thrust bearing at the forward end of the compressor, and a secondary thrust bearing adjacent the turbine to share some of the axial thrust load from the rotor. The secondary thrust bearing is mounted on a diaphragm which is slightly yieldable axially of the engine and is biased by a pressure drop in the engine, preferably the pressure drop across a second stage turbine. As applied to a ducted fan engine, the invention also embodies means for supporting the gas turbine within the fan duct with freedom for relative thermal expansion.

The nature of the invention and its advantages will be apparent to those skilled in the art from the succeeding detailed description of the preferred embodiment. Referring to the drawings:

FIGURE 3 is a partial view taken on the same plane as FIGURE 1 illustrating the aft or exhaust end of the engine.

Figure 1:
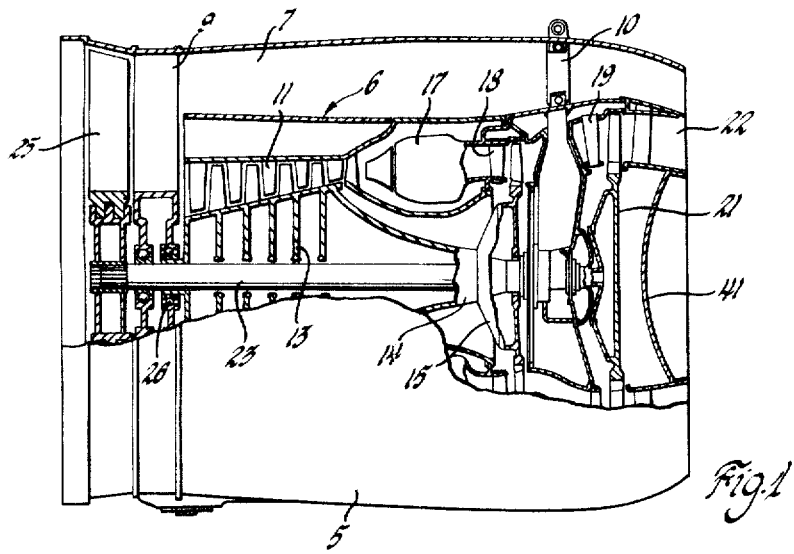
FIGURE 1 is a longitudinal view of a turbofan engine embodying my invention, with parts cut away and in section on a plane containing the axis of the engine.

Referring first to FIGURE 1, the turbojet engine is generally of a known configuration. It comprises a generally cylindrical engine case 5, a roughly cylindrical gas turbine case 6 mounted concentrically within the engine case, these two cases defining between them a fan duct 7. The turbine case is supported in the engine case by struts 9 at the forward end which also constitute outlet vanes for a ducted fan. It is supported by pivoted struts 10 adjacent the rear end of the engine.

The gas turbine engine within the turbine case includes a compressor 11 having a rotor 13 coupled by a conical shaft 14 to a turbine wheel 15. The gas turbine also includes combustion apparatus 17 disposed between the compressor outlet and the turbine inlet nozzle 18. The exhaust from turbine wheel 15 passes through a nozzle 19 to a low pressure turbine wheel 21 and out through an annular exhaust duct 22. Turbine 21 is coupled through shaft 23 to a single stage fan 25 which discharges air through the duct 7 and also into the inlet of compressor 11. The compressor rotor is supported in a ball thrust bearing 26 at its forward end.

Figure 2:
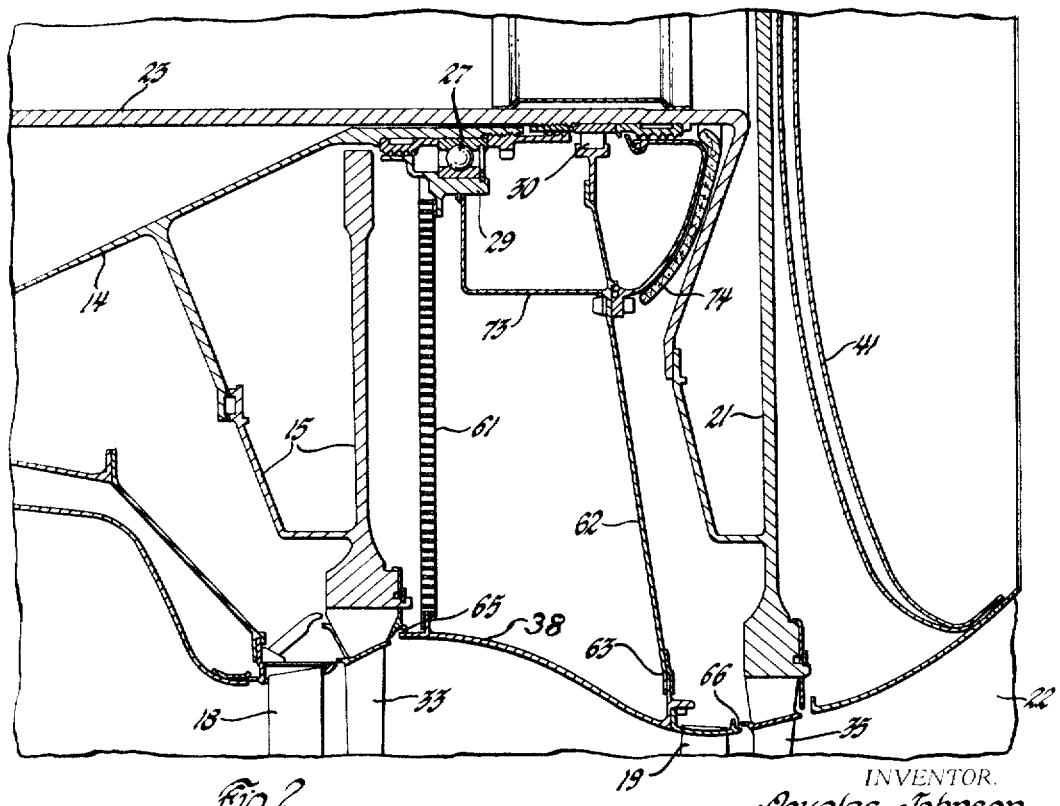
FIGURE 2 is a partial view taken on the same plane as FIGURE 1, illustrating the turbine rotors.

Referring now to FIGURES 2 and 3, the rear end of rotor shaft 14 is supported in a ball thrust bearing 27 fixed in a supporting ring or mount 29 which also supports a roller bearing 30 for the rear end of low pressure turbine shaft 23. Wheel 15 is fixed by bolts 31 to a flange extending from shaft 14. Wheel 21 is similarly fixed to a flange at the rear end of shaft 23. The motive fluid path for the turbines is from the combustion apparatus 17 through nozzle 18 and blades 33 on wheel 15, past strut fairings 34 to be described, through low pressure nozzle 19 and low pressure turbine blades 35, past struts 37 to the exhaust 22. This motive fluid path lies between the turbine case 6 and an inner wall defined by a fixed shroud 38 between the turbines and a converging annular wall 39 downstream of turbine wheel 21 and supported by struts 37. The rear end of the inner wall is closed by a concave disk 41.

The turbine case 6 in the vicinity of the turbines is double-walled, having a first outer section 42 and a downstream outer section 43. A wall 45 is mounted within the section 42 and a wall 46 within the section 43. Wall 45 constitutes an outer fixed shroud which is a unitary welded or cast structure with fairings 34 and inner shroud 38. There are a suitable number of fairings 34, preferably six in a particular case, through which are disposed struts extending from the wall 42 to the bearing mount 29. The struts consist of a forward channel section 47 and a rear channel section 49 which are welded to the mount 29 and extend radially, preferably with a slight bowing as indicated. The outer ends of channels 47 and 49 are welded to the case portion 42 adjacent stiffening flanges 50 and 51, respectively.

Bosses 53 extending from the case 42 between the stiffening rings define clevises within which are mounted the outer struts 10 by pins 55. These struts are similarly connected by pins 57 to clevises 58 extending from the inner side of the engine case 5. One or more engine mounting points 59 may be disposed adjacent the outer ends of struts 10.

A first or forward diaphragm 61 extends from the bearing mount 29 to the shroud 38 immediately forward of the channel 47 and a second or rear diaphragm 62 extends from the mount to the rear edge of shroud 38. A radial slip joint connection 63 is provided between diaphragm 62 and shroud 38. The diaphragm 61, which is intended to be pressure-loaded, is of cellular construction for greater strength and light weight. It may be welded or otherwise sealed to the mount 29 and shroud 38 at its margins so as to be pressure-tight. Diaphragm 62 is a heat shield but is not pressure-tight. Pressure of the motive fluid downstream of first stage turbine blades 33 leaks to some extent through a seal 65 between the wheel 15 and shroud 38. Similarly, pressure downstream of the low pressure turbine nozzle 19 leaks through a gap 66 upstream of second stage turbine wheel 21. This pressure may flow through the slip joint 63 or through small openings in diaphragm 62 to exert pressure on the rear face of diaphragm 61. Thus, the diaphragm 61 is biased rearwardly of the engine by the pressure drop across nozzle 19. It thus exerts a force on the outer race of secondary thrust bearing 27 biasing the high pressure rotor rearwardly. The normal thrust of the rotor is forward and thus the secondary thrust bearing takes some of the thrust load off the main thrust bearing 26. The diaphragms 61 and 62 are capable of dishing slightly in the axial direction so as to accommodate the variations in relative axial length of the turbine rotor and stator which occur with changes in temperature. The struts 10 are mounted for swinging movement to accommodate the relative large changes in relative axial length of the hot turbine case and cool engine case as the engine is put into operation.

The fairings 34 provide a rigid connection between the shrouds 45 and 38. The channel section struts 47 and 49, on the other hand, are sufficiently flexible to allow relative axial movement of the bearing mount 29.

It will be seen, therefore, that structure according to the invention makes due allowance for relative thermal expansions and contractions within the engine; and provides a flexible strut structure and a pressure-responsive structure inherently biasing the secondary thrust bearing to partially unload the main thrust bearing.

FIGURE 2 shows an oil sump 73 built onto bearing mount 29 and an insulating pad 74 behind the bearing mount. The structure of turbine wheels 15 and 21 is the subject of United States patent application Ser. No. 452,185 of Johnson et al., filed Apr. 30, 1965, of common ownership with this application, and is not material to the present invention.

While the turbine and compressor rotors are rigidly fixed together in the preferred embodiment, it is apparent that diaphragm 61 and bearing 29 can relieve the main bearing 26 of thrust so long as the compressor and turbine rotors are coupled to form a single rotor to the extent that axial loads as well as torque are transmitted between them.

The detailed description of the preferred embodiment of the invention for the purpose of explaining the principles thereof is not to be considered as limiting or restricting the invention, since many modifications may be made by the exercise of skill in the art.

I claim:

1. A turbojet engine of a ducted-fan type comprising, in combination,
   an engine case
   a gas turbine case within the engine case, the engine and gas turbine cases defining a fan duct
   a compressor, a combustion apparatus, a high pressure turbine, and a low pressure turbine within the gas turbine case, the high pressure turbine and the compressor being coupled to form a single rotor
   an inner wall defining with the turbine case the motive fluid path between the turbines
   a bearing for the said rotor at the compressor
   a thrust bearing for the said rotor between the turbines within the inner wall
   a mount for the bearing between the turbines
   a diaphragm extending from the mount to the inner wall having a substantial portion thereof subjected to a pressure drop in the low pressure turbine biasing the diaphragm and mount rearwardly, and
   flexible inner struts connecting the mount to the gas turbine case.

2. A turbojet engine comprising, in combination,
   a gas turbine case
   a compressor, a combustion apparatus, a high pressure turbine, and a low pressure turbine within the gas turbine case, the high pressure turbine and the compressor being coupled to form a single rotor
   an inner wall defining with the turbine case the motive fluid path between the turbines
   a main thrust bearing for the said rotor at the compressor
   a secondary thrust bearing for the said rotor between the turbines within the inner wall
   a mount for the secondary thrust bearing
   a diaphragm extending from the mount to the inner wall having a substantial portion thereof subjected to a pressure drop in the low pressure turbine biasing the diaphragm and mount rearwardly
   flexible inner struts connecting the mount to the gas turbine case, and
   fairings surrounding the inner struts extending from the gas turbine case to the inner wall.

3. A turbojet engine of a ducted-fan type comprising, in combination,
   an engine case
   a gas turbine case within the engine case, the engine and gas turbine cases defining a fan duct
   a compressor, a combustion apparatus, a high pressure turbine, and a low pressure turbine within the gas turbine case, the high pressure turbine and the compressor being coupled to form a single rotor
   an inner wall defining with the turbine case the motive fluid path between the turbines
   a main thrust bearing for the said rotor at the compressor
   a secondary bearing for the said rotor between the turbines within the inner wall
   a mount for the secondary bearing
   a diaphragm extending from the mount to the inner wall
   flexible inner struts connecting the mount to the gas turbine case
   fairings surrounding the inner struts extending from the gas turbine case to the inner wall, and
   outer struts pivotally connected to the gas turbine case adjacent to the inner struts and pivotally connected to the engine case.

4. A turbojet engine of a ducted-fan type comprising, in combination,
   an engine case
   a gas turbine case within the engine cast, the engine and gas turbine cases defining a fan duct
   a compressor, a combustion apparatus, a high pressure turbine, and a low pressure turbine within the gas turbine case, the high pressure turbine and the compressor being coupled to form a single rotor
   an inner wall defining with the turbine case the motive fluid path between the turbines
   a main thrust bearing for the said rotor at the compressor
   a secondary thrust bearing for the said rotor between the turbines within the inner wall
   a mount for the secondary thrust bearing
   a diaphragm extending from the mount to the inner wall having a substantial portion thereof subjected to a pressure drop in the low pressure turbine biasing the diaphragm and mount rearwardly
   inner struts connecting the mount to the gas turbine case
   fairings surrounding the inner struts extending from the gas turbine case to the inner wall, and
   outer struts pivotally connected to the gas turbine case adjacent to the inner struts and pivotally connected to the engine case.

References Cited by the Examiner

UNITED STATES PATENTS

| | | | |
|---|---|---|---|
| 3,163,353 | 12/1964 | Petrie | 60—39.31 X |
| 3,261,587 | 7/1966 | Rowley | 253—39 |

JULIUS E. WEST, *Primary Examiner.*

UNITED STATES PATENT OFFICE
CERTIFICATE OF CORRECTION

Patent No. 3,313,105                                     April 11, 1967

Douglas Johnson

It is hereby certified that error appears in the above numbered patent requiring correction and that the said Letters Patent should read as corrected below.

Column 2, line 54, after "bearing" insert -- 27 --; column 4, line 31, for "cast" read -- case --.

Signed and sealed this 14th day of November 1967.

(SEAL)
Attest:

Edward M. Fletcher, Jr.                                EDWARD J. BRENNER
Attesting Officer                                           Commissioner of Patents